United States Patent
Wai

[11] Patent Number: 6,006,939
[45] Date of Patent: Dec. 28, 1999

[54] STEAM VENTS FOR COOKWARE

[75] Inventor: Hon-Wah Wai, Kowloon Bay, The Hong Kong Special Administrative Region of the People's Republic of China

[73] Assignee: Sunderland Holding Limited, The Hong Kong Special Administrative Region of the People's Republic of China

[21] Appl. No.: 09/114,459

[22] Filed: Jul. 13, 1998

[51] Int. Cl.[6] ..................................................... B65D 51/16
[52] U.S. Cl. ................ 220/203.05; 220/201; 220/203.04
[58] Field of Search ............................... 220/201, 203.01, 220/203.04, 203.05, 203.06, 203.07, 573.1, 367.1, 373, 374

[56] References Cited

U.S. PATENT DOCUMENTS

| | | | |
|---|---|---|---|
| 2,592,992 | 4/1952 | Abercrombie | 220/203.05 X |
| 3,559,839 | 2/1971 | Seethaler | 220/201 |
| 4,457,327 | 7/1984 | Pepper | 220/201 X |
| 4,557,396 | 12/1985 | Baumgarten | 220/203.05 |
| 5,370,257 | 12/1994 | Chameroy et al. | 220/203.01 X |

Primary Examiner—Stephen K. Cronin
Attorney, Agent, or Firm—Jackson Walker L.L.P.

[57] ABSTRACT

A steam vent arrangement comprises a pan lid knob that incorporates a rotatable member that carries a slidable plunger. The plunger is moved by an SMA element to allow steam to vent via the knob and an aperture in a lid of the pan.

4 Claims, 2 Drawing Sheets

STEAM VENTS FOR COOKWARE

BACKGROUND OF THE INVENTION

1. Field of the Invention

The invention relates to steam vents for cookware.

2. Description of Prior Art

It is already known to provide adjustable steam vents which are conveniently mounted on a top lid of a cooking utensil. The effective size of a vent or aperture is controlled by partially closing off the aperture using a movable plate. The plate is manually adjustable relative to the aperture and remains in a chosen position so that the aperture is normally open or closed off as required. The vent is open or closed when cooking commences, and manually adjusted if necessary as cooking proceeds, requiring close supervision and attendance by the user.

SUMMARY OF THE INVENTION

It is an object of the invention to at least reduce or overcome this problem.

According to the invention there is provided a steam vent arrangement for a closable cooking utensil which has a lid, the arrangement comprising a body that forms a lifting knob for the lid which has a base that fits against a top surface of the lid, a manually rotatable member having two operative positions that fits inside the body, the member being shaped to open and close off a steam passageway through the body according to the rotational position of the member, a slidable plunger supported by and movable with the rotatable member that serves to close off the passageway when required, and an activator formed of shaped memory alloy material that automatically slides the plunger to open the passageway to allow steam to escape through the body to atmosphere when the temperature in the utensil rises to a predetermined value.

Preferably, the rotatable member has an integrally formed upstanding flag that enables it to be manually rotated and in use visually indicates its relative rotation position within the body.

The body may be formed with an integrally formed centrally offset downward extending stud arranged to locate in an aperture in the lid to prevent rotation of the body relative to the lid.

An integrally formed threaded hole may be provided in the base of the body arranged to receive a securing screw that extends through the lid for holding the body to the lid.

BRIEF DESCRIPTION OF THE DRAWINGS

A steam vent arrangement according to the invention will now be described by way of example with reference to the accompanying drawings in which.

DESCRIPTION OF THE PREFERRED EMBODIMENT

Figure 1:
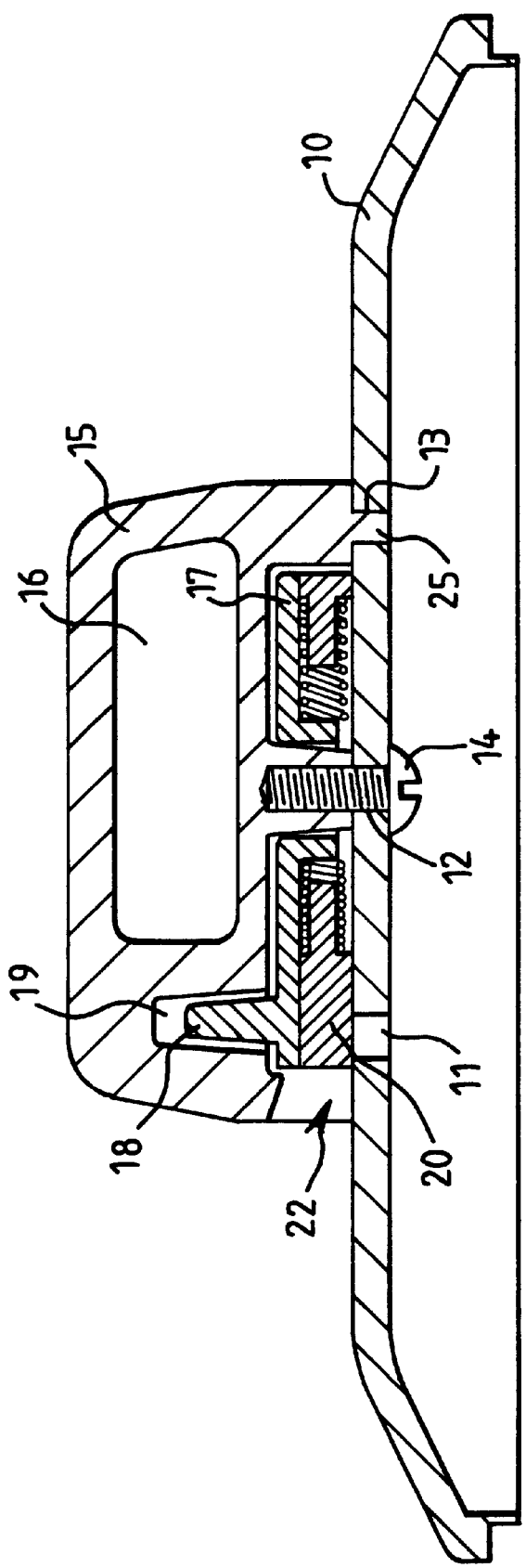
FIG. 1 shows a sectional elevation of the vent arrangement and a pan lid.

Referring to the drawings, in FIG. 1 a pan lid 10 has three apertures 11, 12 and 13 and the vent arrangement 13 is mounted to the lid and held in position by a screw 14 extending through the aperture 12. The vent arrangement comprises a generally circular body 15 formed with an aperture 16 to receive fingers of a user to enable the body to form a lifting knob for the lid.

A circular member 17 is mounted inside the body 15 and constrained circumferentially and centrally by integral formations in the body so that the member can rotate around a central axis of the body. The member 17 has an upstanding finger or flag 18 that extends over about 40° of arc of the member 17 and rides through a slot 19 in the body 15 when the member 17 is manually rotated. The slot extends over an arc of about 20°. The finger 18 serves two purposes; it enables the member 17 to be manually rotated and also visually indicates, by its position, the relative rotational position of the member 17.

A slidable plunger 20 is mounted within the member 17 in a slot 21 (see FIGS. 2 to 4) so that the sliding axis of the plunger 20 moves round with the member 17 about its central axis. A venting passageway 22 extends through the body 15 and normally communicates the aperture 11 in the lid 10. In FIG. 1 the passageway is closed off by a forward end of the plunger 20 in a manner to be explained below.

Figure 2:
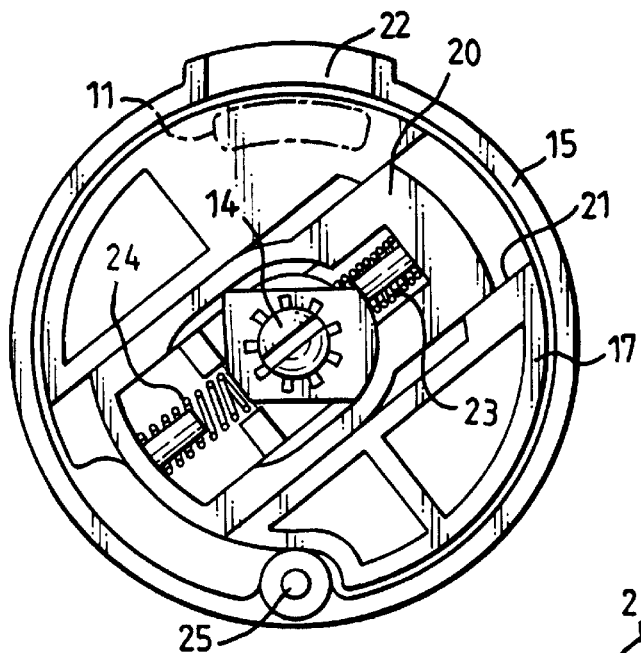
FIGS. 2 to 4 show underplan views of the vent arrangement in different configurations.
Figure 3:
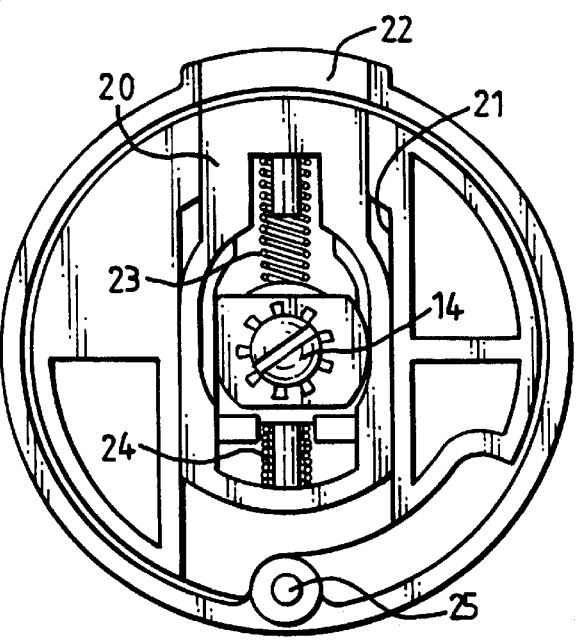

In FIGS. 2 and 3 various components are shown with the vent arrangement in different configurations. The plunger 20 is normally held by a spring 23 with its forward tip in line with a peripheral edge of the member 17, as shown in FIG. 3. When the temperature inside the pan rises to a predetermined value coil shaped memory alloy element 24 expands and pushes the plunger 20 inwards, against the bias of the spring 23, to the position shown in FIGS. 1 and 3. An integrally formed stud 25 fits through the aperture 13 to prevent rotational movement of the body 15.

The rotatable member 17 has two operative positions. The first operative position is shown in FIG. 2 where the member permanently closes off the passageway 22 so that steam cannot escape from the pan via the aperture 11 to atmosphere. The plunger 20 is shown in a "withdrawn" position which would be the case if the temperature in the utensil is high enough to cause expansion of the element 24. However, the position of the plunger 20 is irrelevant in FIG. 1 because the passageway 22 remains permanently closed off by the member 17.

Figure 4:
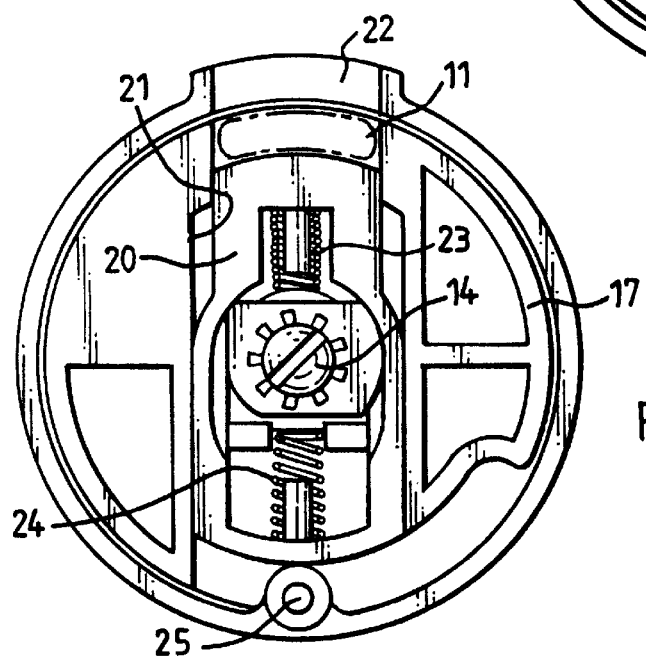

In FIGS. 3 and 4, the member 17 is in its second operative position. In FIG. 3, the passageway 22 remains closed off because the forward end of the plunger 20 covers over the aperture 11. In the event that the temperature inside the pan rises to values that cause the activator element 24 to expand, the plunger will be automatically moved towards and to a fully open position, as shown in FIG. 4.

Thus, the described vent arrangement which is formulated within what might otherwise be a pan lid lifting knob, provides a manual operative arrangement that either permanently closes off a venting passageway or is positioned so as to allow the passageway to be opened automatically as required using an SMA element.

We claim:

1. A steam vent arrangement for a closable cooking utensil which has a lid, the arrangement comprising a body that forms a lifting knob for the lid which has a base that fits against a top surface of the lid, a manually rotatable member having two operative positions that fits inside the body, the member being shaped to open and close off a steam passageway through the body according to the rotational position of the member, a slidable plunger supported by and movable with the rotatable member that serves to close off the passageway when required, and an activator formed of shaped memory alloy material that automatically slides the plunger to open the passageway to allow steam to escape through the body to atmosphere when the temperature in the utensil rises to a predetermined value.

2. A steam vent arrangement according to claim 1, in which the rotatable member has an integrally formed upstanding flag that enables it to be manually rotated and in use visually indicates its relative rotation position within the body.

3. A steam vent arrangement according to claim 1, in which the body is formed with an integrally formed centrally offset downward extending stud arranged to locate in an aperture in the lid to prevent rotation of the body relative to the lid.

4. A steam vent arrangement according to claim 1, including an integrally formed threaded hole in the base of the body arranged to receive a securing screw that extends through the lid for holding the body to the lid.

* * * * *